A. G. Wilson,

Liquid Measure.

No. 109,283. Patented Nov. 15, 1870.

WITNESSES.

Chas. A. Harkness
S. J. Powers

INVENTOR.
Arthur G. Wilson.
By Farwell, Ellsworth & Co.
Attorneys.

UNITED STATES PATENT OFFICE.

ARTHUR GATES WILSON, OF CHICAGO, ILLINOIS.

IMPROVEMENT IN MEASURING-CANS.

Specification forming part of Letters Patent No. 109,283, dated November 15, 1870; antedated November 5, 1870.

*To all whom it may concern:*

Be it known that I, ARTHUR GATES WILSON, of Chicago, in the county of Cook and State of Illinois, have invented a new and useful Combined Pump and Can; and I do hereby declare the following to be a full, clear, and exact description thereof, which will enable others skilled in the art to which my invention appertains to make and use the same, reference being had to the accompanying drawing, forming part of this specification.

Figure 1:
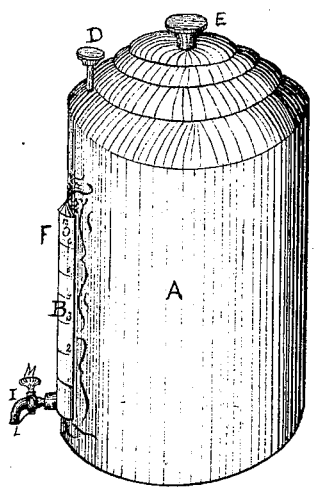
Figure 2:
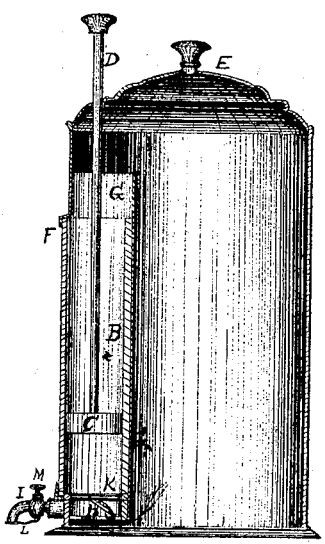

Figure 1 is a perspective view of my improved pump and can combined, and Fig. 2 is a vertical longitudinal section of the same.

Similar letters of reference indicate corresponding parts in the several figures of the drawing.

My invention has for its object to produce a liquid-can which shall contain within it the means for measuring and discharging the liquid accurately.

To this end it consists in arranging within an oil or other liquid can a glass pump-cylinder containing a piston, in the manner to be hereinafter described.

In the accompanying drawing, A is a sheet-metal can, of the ordinary or suitable construction, such as are usually employed for liquids upon draft. Within the can, upon one side, is placed the glass cylinder B, which receives the piston C, in such a manner that the rod D extends through the cap of the can upon one side of the cover E, so that it shall not interfere with the opening of the latter. The side of the can is cut away, as shown at F, to show a portion of the cylinder, which portion is graduated to different quantities of liquid to be drawn, as one pint, one quart, one gallon, &c.

The glass cylinder is retained in place within the can by the metallic shield G, bent around the cylinder, as shown, and secured at its edges to the can. This shield also serves to protect the cylinder from injury.

H is a valve hung in the cylinder at its lower end, or in the lower end of the shield G, slightly above the bottom of the can, and I is the faucet by which the liquid is discharged from the cylinder.

The operation is as follows: When it is desired to draw a measure of liquid from the can, the piston is lifted by hand and the liquid rushes into the cylinder B at the base, as shown by the arrow, lifting the valve and filling the cylinder to the desired height.

The quantity of liquid is readily observed from the outside of the can, owing to the transparency of the cylinder, and determined by the graduation upon the latter.

To discharge the liquid, the faucet is opened and the piston forced down, which operation closes the valve H, as in ordinary pumps, consequently cutting off communication with the interior of the can, the liquid passing through the faucet into any suitable receptacle.

K is a ring or shoulder placed within the cylinder immediately above the faucet, to prevent the piston in its descent from covering the entrance to the faucet.

L is a metallic plate secured by a rod or arm to the lower end of the cock M of the faucet, for the purpose of closing under the discharge end of the latter to prevent the liquid from dripping. It moves with the cock to open and close the faucet.

By my invention a can is produced for the trade supplied with the required measuring device, made in and forming a part of the can.

I am aware that transparent graduated cylinders have been used upon the faucets of metal cans, outside of the latter, and forming a part of the faucet; but they form no part of the can, and cannot be transported with safety from place to place. Occupying a position outside of and detached from the can, they are always liable to become broken. They are, moreover, so arranged as to measure the liquid by its own gravity, and with viscid liquids are consequently inoperative.

Having thus described my invention, what I claim as new, and desire to secure by Letters Patent, is—

A metallic liquid-can having a transparent pump-cylinder containing a piston arranged within it, with its graduated side exposed to view through the side of the can, substantially as described, for the purpose specified.

ARTHUR GATES WILSON.

Witnesses:
H. C. DE FOREST,
D. I. POWERS.